US006389901B1

(12) United States Patent
Joos et al.

(10) Patent No.: US 6,389,901 B1
(45) Date of Patent: May 21, 2002

(54) DIAGNOSTIC METHOD FOR A FUEL SUPPLY SYSTEM

(75) Inventors: Klaus Joos, Walheim; Jens Wolber, Gerlingen; Thomas Frenz, Noerdlingen, all of (DE); Hansjoerg Bochum, Novi, MI (US); Markus Amler, Leonberg-Gebersheim (DE)

(73) Assignee: Robert Bosch GmbH, Stuttgart (DE)

( * ) Notice: Subject to any disclaimer, the term of this patent is extended or adjusted under 35 U.S.C. 154(b) by 61 days.

(21) Appl. No.: 09/671,609

(22) Filed: Sep. 28, 2000

(51) Int. Cl.[7] .................................................. G01L 7/00

(52) U.S. Cl. .......................................................... 73/714

(58) Field of Search .......................... 73/716, 717, 722, 73/725, 756, 426, 861.42, 861.43, 861.44, 714; 123/447, 456, 506, 495–497; 60/274, 294, 303, 305, 311; 137/263, 172, 566–571

(56) References Cited

U.S. PATENT DOCUMENTS 4,452,040 A * 6/1984 Kobashi ...................... 60/274
5,078,901 A * 1/1992 Sparrow ...................... 137/566
6,298,831 B1 * 10/2001 Rembold et al. ........... 123/497

* cited by examiner

*Primary Examiner*—William Oen
(74) *Attorney, Agent, or Firm*—Walter Ottesen

(57) ABSTRACT

The invention is directed to a method and an arrangement for operating a fuel supply system (10) and especially a fuel supply system of an internal combustion engine of a motor vehicle. Fuel is pumped into an accumulator (19) with the aid of pumps (13, 24) and the fuel is adjusted at least to a first pressure (P1) or a second pressure (P2). Initially, the first pressure (P1) is adjusted and a pressure signal (PS1) is detected and, thereafter, the second pressure (P2) is adjusted and a pressure signal (PS2) is detected. A pressure difference (ΔP) is formed from the detected first and second pressure signals (PS1, PS2). If the pressure difference ΔP deviates from an expected pressure difference (ΔP_E) by more than a threshold value (S), then a fault in the fuel supply system (10) is detected and stored.

15 Claims, 2 Drawing Sheets

DIAGNOSTIC METHOD FOR A FUEL SUPPLY SYSTEM

FIELD OF THE INVENTION

The invention relates to a method for operating a fuel supply system and especially a fuel supply system of an internal combustion engine of a motor vehicle wherein the fuel is pumped into an accumulator with the aid of a pump and wherein the fuel pressure is adjusted to at least a first pressure P1 or a second pressure P2.

BACKGROUND OF THE INVENTION

German patent publication 198 18 421 discloses a fuel supply system having two fuel pumps connected in series and fuel valves injecting directly into the combustion chamber. A pressure control valve and a valve device are provided in a fuel supply line. The pressure control valve and the valve device are hydraulically connected to operate one behind the other. A second pressure control valve is provided in a further fuel line. The pressure, which is controlled by the second control valve, is significantly higher than the pressure held by the first pressure control valve. -he first pressure control valve controls the pressure on its input end, for example, to 3 bar. The second control valve is, for example, adjusted to a pressure of 9 bar. The valve device has a first switching position and a second switching position. In the first switching position, fuel can flow through the fuel line via the pressure control valve. The fuel line is cut off when the valve device is in its second switching position.

The valve device is in its first switching position in the normal operating state of the engine, that is, after conclusion of the starting operation of the engine and when the fuel temperature is not too high. The fuel pressure in the fuel connection is determined by the first pressure control valve when the valve device is in its first switching position. The first pressure control valve ensures that, in the normal operating state, the fuel pressure is held to be correspondingly substantially constant at a normal value, for example, 3 bar.

During the starting operation (that is, at an increased fuel temperature), the valve device is in the second switching position wherein the fuel path for the fuel through the fuel line is closed. When the fuel line is closed, the second pressure control valve determines the magnitude of the fuel pressure in the fuel connection.

SUMMARY OF THE INVENTION

It is an object of the invention to provide a reliable diagnostic method for a fuel supply system such as for an internal combustion engine of a motor vehicle.

The method of the invention is for operating a fuel supply system including a fuel supply system of an internal combustion engine for a motor vehicle. The method includes the steps of: pumping fuel with a pump into an accumulator wherein the fuel is under pressure; adjusting the fuel pressure to at least a first pressure (P1) and detecting a first pressure signal (PS1); adjusting the fuel pressure to at least a second pressure (P2) and detecting a second pressure signal (PS2); forming a pressure difference (ΔP) from the first and second pressure signals (PS1, PS2); and, recognizing and storing a fault in the fuel supply system when the pressure difference (ΔP) deviates from an expected pressure difference (ΔP_E) by more then a threshold value (S).

An especially significant advantage of the invention is that a precise diagnosis of the fuel supply system is achieved without additional components.

A further advantage is that the diagnosis is possible with the aid of a fuel pressure sensor mounted in a high pressure region.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
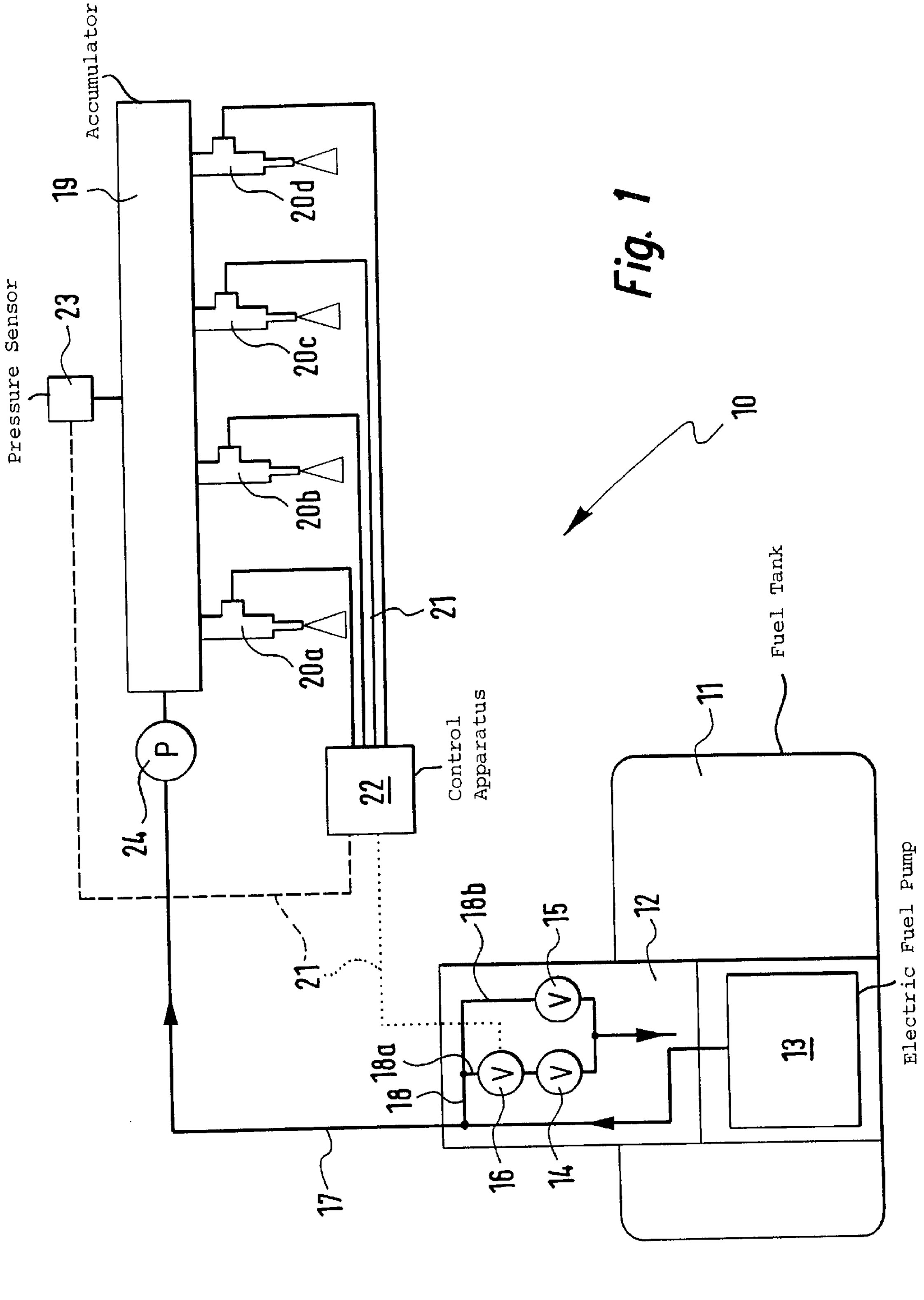
FIG. 1 is a schematic of an arrangement of the invention for operating a fuel supply system of an internal combustion engine; and, FIG. 2 is a flowchart showing the sequence of the diagnosis of a fuel supply system in accordance with the invention.

FIG. 1 shows a fuel supply system 10 which is provided for use in an internal combustion engine.

A pumping module 12 is mounted in a fuel tank 11. The pumping module 12 includes an electric fuel pump 13, a first mechanical pressure controller 14, a second mechanical pressure controller 15 and a check valve 16. A fuel line 17 leads from the electric fuel pump 13 to a high pressure pump 24. A return line 18 runs from the fuel line 17 back into the tank 11. The return line 18 includes a first branch 18*a* and a second branch 18*b*. The check valve 16 and the first pressure controller 14 are connected in the first branch 18 so as to operate hydraulically one behind the other. This means that the check valve 16 and the first pressure controller 14 are connected in series in the circuit. The second lower set pressure controller 15 is in the second branch 18*b*. In this way, the second pressure controller 15 is connected in parallel with the check valve 16 and the first pressure controller 14.

The check valve 16 can, for example, be brought into its first switching position or into a second switching position, for example, with the aid of an electrical signal or with the aid of a bimetal switch. In the first switching position, fuel can flow back out of the fuel line 17 through the first branch 18*a* via the first pressure controller 14 into the fuel tank 11. If the check valve 16 is in the second switching position, then the first branch 18*a* is blocked. If the check valve 16 is in the first switching position, then the fuel pressure in the fuel line 17 is determined by the first pressure controller 14 and the second lower adjusted pressure controller 15. In contrast, if the check valve 16 is in the second switching position, then the pressure in the fuel line 17 is determined only by the lower adjusted pressure controller 15. In this way, it is possible to adjust two different fuel pressures in the fuel line 17.

An accumulator 19 is connected to the high pressure pump 24 and the injection valves 20*a* to 20*d* are mounted on the accumulator. The injection valves 20*a* to 20*d* are connected to the accumulator 19 and are preferably assigned directly to the combustion chambers of the engine.

The fuel is pumped with the aid of the electric fuel pump 13 from the fuel tank 11 via the fuel line 17 to the high pressure pump 24. In dependence upon the switching position of the check valve 16, the fuel in the fuel line 17 is adjusted to a first pressure of approximately 3 bar or to a second pressure of approximately 9 bar. The high pressure pump 24, which is preferably driven directly by the engine, compresses the fuel and pumps the fuel into the accumulator 19. In this way, the fuel pressure reaches values of up to 120 bar. The injection valves 20*a* to 20*d* can be individually driven and the fuel is injected directly into the combustion chambers of the engine via these injection valves.

A pressure sensor 23 is connected directly to the accumulator 19. The actuators such as injection valves 20, check valve 16 and the sensors such as pressure sensor 23 are connected directly to the control apparatus 22 via the signal and control lines 21.

The actual value of the fuel pressure in the accumulator 19 is detected with the aid of the pressure sensor 23. The actual value of the fuel pressure is supplied via the signal line 21 to the control apparatus 22. A drive signal is formed in the control apparatus 22 on the basis of the detected actual value of the fuel pressure and the check valve 16 is driven by this drive signal. In this way, it is possible to control the fuel pressure in the accumulator 19.

Various functions which operate to control the engine are implemented in the control apparatus 22. These functions are, as a rule, programmed on a computer and subsequently stored in a memory of the control apparatus 22. The functions stored in the memory are activated in dependence upon the requirements imposed on the engine. Especially severe requirements are placed on the real time capability of the control apparatus 22 in combination with the functions. In principle, however, a pure hardware realization of the functions for controlling the engine is possible.

Figure 2:
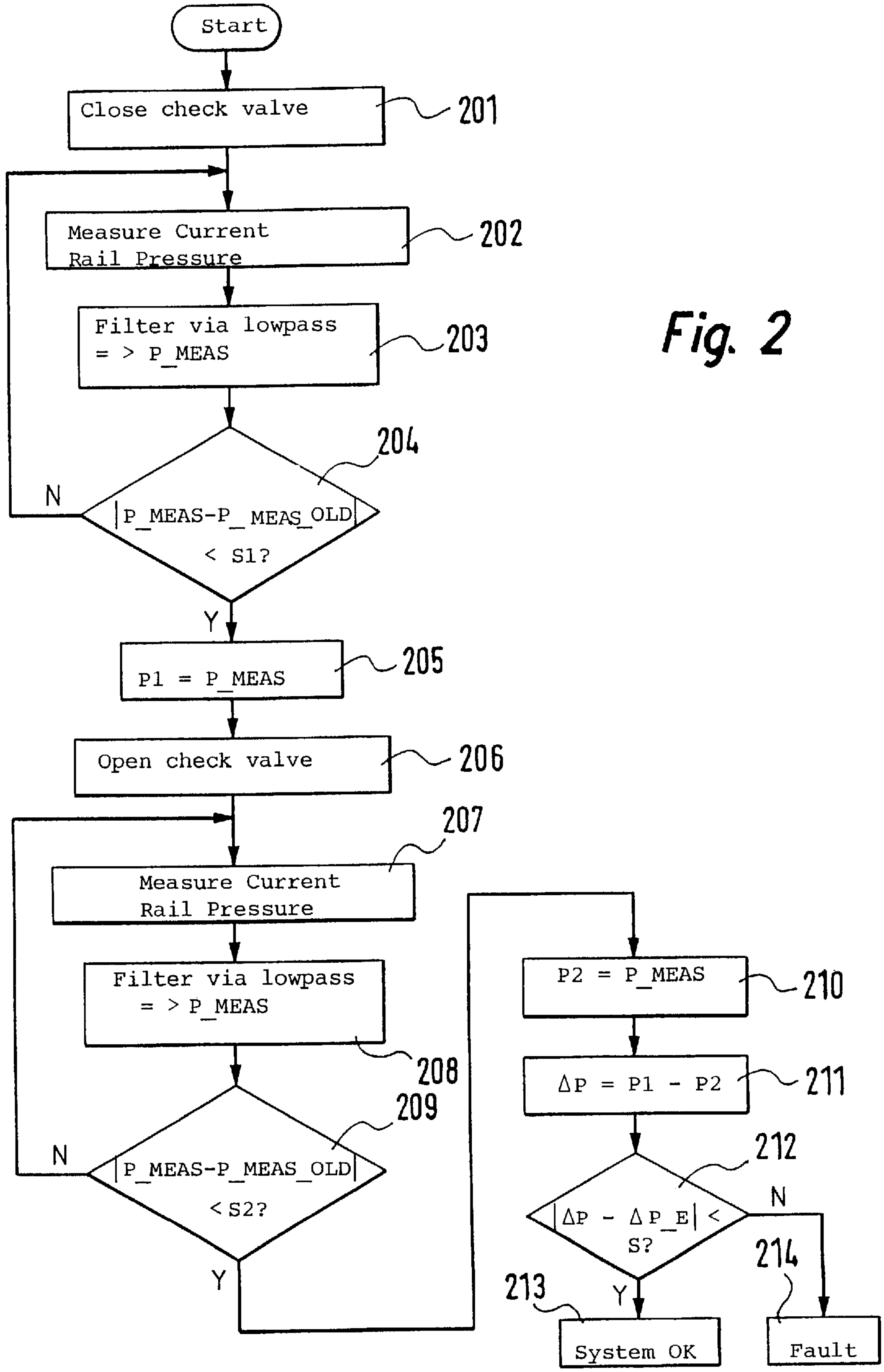

In FIG. 2, an embodiment of a method for diagnosing a fuel supply system in accordance with the embodiment of the invention is shown.

An important condition precedent for carrying out the method is that the fuel pressure is approximately the same in the fuel line 17 and in the accumulator 19 during the method. This condition is not present in the normal operation of the engine so that the method is carried out only in specific operating phases of the engine in which this condition is present. These operating phases can be as follows:

a) at the end of an assembly line, the electric fuel pump 13 is driven with the aid of a test device and the high pressure pump 24 is not driven so that the same pressure can adjust in the fuel line 17 and in the accumulator 19;

b) during a prerun, that is, between switching on the ignition and a meshing of the starter pinion;

c) during a control apparatus after-run, that is after switching off the engine; or, d) during a start of the engine at low pressure.

After the start of the method, the check valve 16 is first closed in step 201, that is, the check valve is brought into the second switching position. From this, it is expected that the pressure in the pressure line 17 is adjusted to a value which is determined by the second pressure control 15. For example, a desired pressure of 6 bar is expected.

In step 202, the actual or current pressure in the accumulator 19 is detected with the aid of the pressure sensor 23.

In step 203, the fuel pressure P_MEAS (detected with the aid of the pressure sensor 23) is filtered via a lowpass filter whereby high frequency disturbances are removed from the signal.

In step 204, the actual detected pressure value P_MEAS is compared to the pressure value P_MEAS_OLD from the previous computation step. If the amount of the difference of the actual pressure value and the pressure value from the previous computation step is less than a threshold value S1, then the actual pressure value P1 is stored. If, in contrast, the amount of the difference is greater than the threshold value S1, then a return to step 202 takes place. The steps 202 to 204 are repeated until an almost constant pressure value is adjusted.

After the first pressure value P1 is stored in step 205, the check valve 16 is opened in step 206. In this way, the pressure in the fuel line 17 is determined by the first pressure controller 14 and by the lower adjusted pressure controller 15 and a second pressure of, for example, 4 bar then results.

In step 207, the actual or current fuel pressure is detected with the aid of the pressure sensor 23 in the same manner as in step 202. In step 208, the detected value of the fuel pressure P_MEAS is filtered via a lowpass filter in the same way as in step 203. In step 209, the actual or current detected pressure value P_MEAS is compared to the pressure value P_MEAS_OLD from the previous computation step in the same manner as in step 204. As long as the amount of the difference of the actual pressure P_MEAS and the pressure value from the previous computation step P_MEAS_OLD is greater than a threshold value S2, then steps 207 to 209 are continuously repeated. In this way, the pressure value is only stored when a steady-state condition has adjusted in the accumulator 19.

In step 210, the actual pressure value is stored. In step 211, the difference ΔP is determined from the first pressure value P1 and the second pressure value P2. In step 212, a check is made as to whether the determined difference ΔP corresponds to an expected difference within specific tolerance limits. If this is the case, then, in a step 213, the system is OK. If the difference ΔP deviates considerably from an expected difference ΔP_E, then, in step 214, a fault of the fuel supply system is detected and stored.

The reasons for the fault in the fuel supply system 10 can be, for example, a non-operational check valve 16 or a defective pressure controller (14, 15).

It is understood that the foregoing description is that of the preferred embodiments of the invention and that various changes and modifications may be made thereto without departing from the spirit and scope of the invention as defined in the appended claims.

What is claimed is:

1. A method for operating a fuel supply system including a fuel supply system of an internal combustion engine for a motor vehicle, the method comprising:

pumping fuel with a pump into an accumulator wherein the fuel is under pressure;

adjusting the fuel pressure to at least a first pressure (P1) and detecting a first pressure signal (PS1);

adjusting the fuel pressure to at least a second pressure (P2) and detecting a second pressure signal (PS2);

forming a pressure difference (ΔP) from said first and second pressure signals (PS1, PS2); and, recognizing and storing a fault in said fuel supply system when said pressure difference (ΔP) deviates from an expected pressure difference (ΔP_E) by more then a threshold value (S).

2. The method of claim 1, comprising the further steps of first pumping said fuel into a low pressure region with a first pump; and, then pumping said fuel into a high pressure region with a second pump.

3. The method of claim 2, wherein said low pressure region is defined by at least a fuel line and said high pressure region is defined by at least said accumulator.

4. The method of claim 3, comprising the further step of detecting the pressure of said fuel with the aid of a pressure sensor arranged in said high pressure region.

5. The method of claim 4, comprising the further step of detecting said first and second pressure signals (PS1, PS2) during an operating phase of said engine wherein said fuel pressure in said low pressure region and said high pressure region is almost the same.

6. The method of claim 5, wherein said operating phase can be any one of several operating phases of said engine which include at least the following:

(a) at the end of an assembly line whereat a test apparatus is used;

(b) in a service facility whereat a test apparatus is used;

(c) during a prerun, between switching on an ignition and a meshing of the starter pinion;

(d) during an after run of a control apparatus of said fuel supply system; and, (e) during a start of said engine at low pressure.

7. The method of claim 1, comprising the further step of controlling the pressure of said fuel with the aid of at least first and second mechanical pressure controllers.

8. The method of claim 7, comprising the further step of adjusting said first pressure (P1) and said second pressure (P2) by doing one of the following:

(a) selectively rendering said first pressure controller active or rendering said second pressure controller active; or, (b) selectively rendering said first pressure controller active; or, rendering both said first and second pressure controllers active; and, continuously detecting said pressure signals (PS1, PS2).

9. The method of claim 8, wherein said fuel supply system includes a fuel supply circuit having a check valve; and, wherein the method includes the further steps of:

adjusting said first pressure (P1) by closing said check valve;

adjusting said second pressure (P2) by opening said check valve; and, continuously detecting said pressure signals (PS1, PS2).

10. The method of claim 8, after a request to adjust said first or second pressure (P1, P2), the method comprises the further step of only storing the detected pressure signals (PS1, PS2) for further processing when the amount of the difference between a previous detection and a current detection of the pressure is less than a threshold value (S1, S2).

11. The method of claim 8, comprising the further step of allowing a predetermined time span (T1, T2) to elapse after a request to adjust said first or second pressure (P1, P2) until storing said pressure signals (PS1, PS2).

12. The method of claim 8, wherein said detected pressure signal (PS1, PS2) is filtered with the aid of a lowpass filter.

13. The method of claim 12, wherein said detected pressure signal (PS1, PS2) is only then stored when the filtered signal no longer significantly changes.

14. An arrangement for operating a fuel supply system, the arrangement comprising:

an accumulator wherein the fuel can be held under pressure;

means for pumping said fuel into said accumulator;

means for adjusting said pressure of said fuel to at least a first pressure (P1) or a second pressure (P2);

means for first detecting at least a first pressure signal (PS1) and then detecting a second pressure signal (PS2);

means for forming a pressure difference ($\Delta P$) from said first and second pressure signals (PS1, PS2); and, means for detecting and storing a fault of said fuel supply system when said pressure difference ($\Delta P$) deviates from an expected pressure difference ($\Delta P\_E$) by more than a threshold value (S).

15. The arrangement of claim 14, wherein said fuel supply system is of an internal combustion engine of a motor vehicle.

* * * * *